F. DEXTER.
TIRE.
APPLICATION FILED MAR. 30, 1914.
1,141,620.
Patented June 1, 1915.
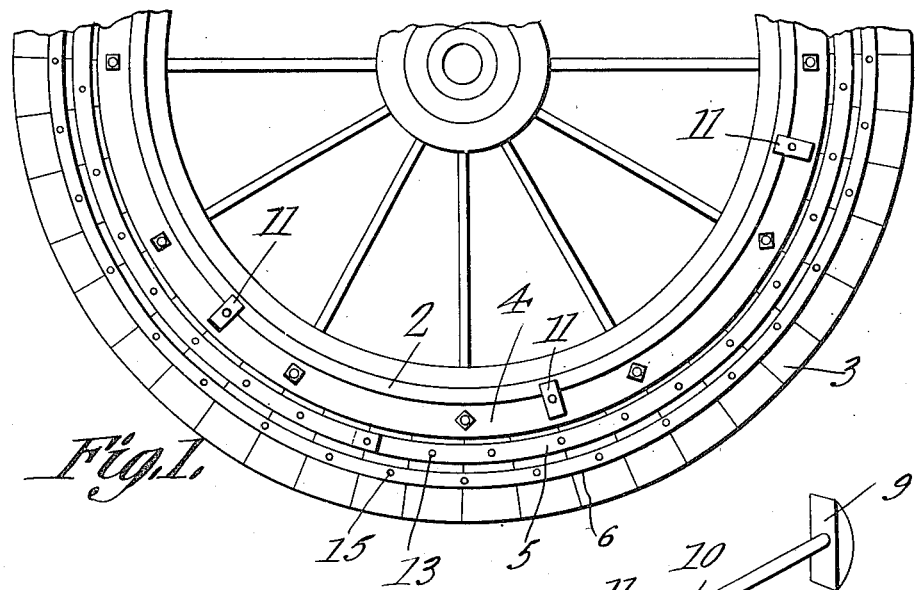
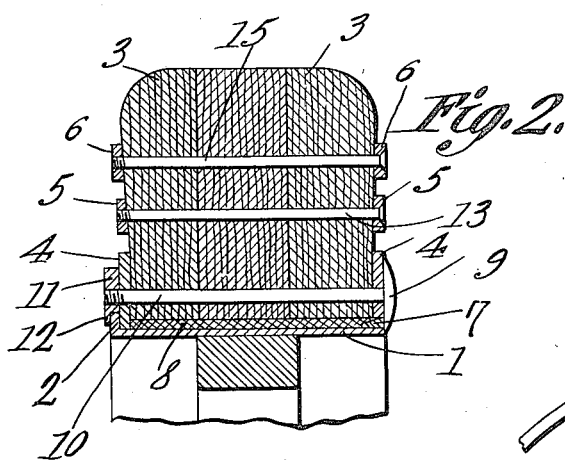
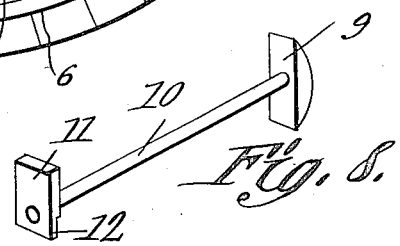
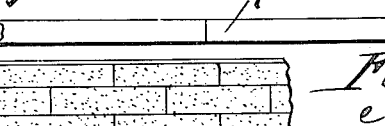
F. Dexter, Inventor

UNITED STATES PATENT OFFICE.

FRANK DEXTER, OF VISTA, FLORIDA.

TIRE.

1,141,620.  Specification of Letters Patent.  Patented June 1, 1915.

Application filed March 30, 1914. Serial No. 828,339.

*To all whom it may concern:*

Be it known that I, FRANK DEXTER, a citizen of the United States, residing at Vista, in the county of Levy and State of Florida, have invented a new and useful Tire, of which the following is a specification.

This invention relates to tires, one of the objects of the invention being to avoid the use of rubber in the construction of a tire such as designed for use in connection with automobile wheels, thus to avoid the excessive cost now incident to the use of pneumatic and cushion tires employing rubber in their construction.

A further object is to provide a tire formed primarily of endogenous growths such as the palmetto or cabbage palm (Sabal palmetto), the said material being arranged in segments with the fibers disposed along substantially radial lines whereby the ends of the fibers are caused to engage the surface on which the tire is mounted, thus to prevent slipping or skidding and at the same time producing a cushioning effect somewhat similar to that resulting from the use of a properly inflated pneumatic tire.

Another object is to provide improved means for holding the parts of the tire, it being possible to separately remove said holding means as the tire wears away and without removing the tire or the wheel.

With the foregoing and other objects in view, the invention consists in certain novel details of construction and combinations of parts and in certain novel steps in the method of treating the stock from which the tire body is made, which will be hereinafter more fully described and pointed out in the claim.

In the accompanying drawings the preferred form of the invention has been shown.

In said drawings:—Figure 1 is a side elevation of a portion of a wheel having applied thereto a tire such as constitutes the present invention. Fig. 2 is an enlarged transverse section through the tire and the wheel rim. Fig. 3 is a plan view of a portion of the tread of the tire and showing the relative positions of the segments making up the tire body. Fig. 4 is an elevation of a portion of one of the inner holding rings of the tire and showing the lap joint used in connection therewith. Fig. 5 is a longitudinal section through the structure shown in Fig. 4 and through the adjacent portion of the tire body. Fig. 6 is an elevation of the meeting portions of the mud ring forming a part of the tire structure. Fig. 7 is a top view of the structure shown in Fig. 6. Fig. 8 is an enlarged view in perspective of one of the fastening elements used for holding the tire to a wheel rim.

Referring to the figures by characters of reference 1 designates the metal rim of the wheel, the same being formed at its inner side with an annular flange 2 constituting means for limiting the inward movement of the tire relative to the rim.

The tire is made up primarily of annular courses of substantially wedge shaped or segmental blocks 3 disposed in staggered relation as shown in Fig. 3 and held securely between rings 4, 5 and 6 which are disposed in pairs and are concentric. The inner ring 4 is designed preferably to fit snugly upon the rim 1 and against the flange 2 while the outer ring 4 is spaced from the outer side of the rim 1 a sufficient distance to receive a tapered mud ring 7 which, as shown in Figs. 6 and 7, is split and has its ends squared and designed to abut. This ring 7 is designed as a finishing ring and to retain between the rim 1 and the inner ends of the blocks 3, a filling of hemp or other like fibrous material shown at 8 and which serves as a cushioning means for absorbing shocks or jolts such as produced by the tire striking obstructions in the path thereof. The mud ring 7 is held in position by elongated heads 9 provided at the outer ends of bolts 10, these bolts being extended transversely through the rings 4 and the inner end portions of the adjacent blocks 3 and being screwed into holding plates 11 which bear against the inner ring 4 and have lips 12 which lap the flange 2.

The intermediate rings 5 are connected by bolts 13 extending therethrough and through the adjacent blocks 3, each of these bolts having its head sunk into the outer ring 5 while its inner or threaded end is screwed into the inner ring 5. Furthermore, and as shown in Figs. 4 and 5, the inner ring is split and has its ends lapped, as at 14, one of the bolts 13 being extended through the inner end of the lap joint while the outer end of the lap is engaged by the threaded end of the bolt. See Fig. 5.

The outer rings 6 are connected by bolts 15 similar to the bolts 13, the inner one of the rings 6 being lapped in the same manner as is the inner ring 5 and the lapping terminals of said inner ring 6 being connected by one of the bolts 15 in the same manner as has been illustrated in Fig. 5.

With the construction described, it will be seen that the blocks 3 will be clamped tightly together by the bolts and rings, and by having split inner rings, the same can be removed entirely from the inner side of the wheel, it being possible to slip them off of the axle on which the wheel is mounted.

The efficiency of the tire is dependent primarily upon the material of which the blocks 3 are formed and upon the method in which this material is treated prior to being incorporated in the tire structure.

As hereinbefore set forth, the blocks 3 are preferably made out of the wood of the cabbage palm or palmetto, this wood being made up of a strong springy fiber and a considerable amount of pith which separates the fibers. The wood is cut into lengths and then placed under considerable pressure so as to expel therefrom a large per cent. of moisture, thus bringing the springy fibers close together. The wood is dried preferably while under pressure and is then saturated with paraffin or other suitable oily substance which fills the pores between the fibers and prevents the stock from absorbing moisture and increases its durability. By thus compressing the stock it becomes possible to readily shape the same and after the various blocks have been produced in the manner set forth, they are assembled in annular courses and in staggered relation, the fibers of the blocks being extended along substantially radial lines so that their ends will form the tread surface of the tire.

It has been found in actual practice that, after the tire has been used for a short time, the outer end portions of the fibers will work apart, thus producing a brush-like tread surface which will grip the surface on which the tire is mounted and prevent slipping and skidding so that it thus becomes unnecessary to use anti-skidding devices of the various types now employed. As the fibers are of a springy nature, the tire has a cushioning action substantially like that obtained by the use of a properly inflated pneumatic tire, this action being increased by the packing which is interposed between the rim 1 and the inner ends of the blocks. The rings 5 and 6 give stability to the tire and, as before pointed out, can be removed readily when the tire becomes worn down to the rings, thus prolonging the life of the tire.

While the structure herein described is particularly designed as a tire for automobile wheels and the like, it is to be understood that it will also be found efficient as a rim construction for pulleys and for various other like devices designed to frictionally engage an opposed element.

While the blocks are preferably arranged in two or more annular courses it is to be understood that if desired a single course of blocks can be used, this arrangement being especially useful in connection with light wheels. Instead of using three rings 4, 5 and 6 at each side of the tire, one or more rings may be employed.

I make no claim in the present case for the peculiar method pursued in the formation of the fiber blocks as this method constitutes the subject matter of a separate application to be filed by me.

What is claimed is:—

The combination with a wheel rim having an annular flange at one side thereof, of a tire including an annular course of blocks, inner rings upon the inner and outer sides of the tire, one of said rings engaging the flanged end of the rim, a ring insertible between the other one of the inner rings and the rim, a bolt extended transversely through the said inner and outer rings and having a head lapping said inserted ring to hold it in position, means engaging the bolt and lapping the flange of the rim to hold the tire against displacement relative to the rim, and a packing interposed between the blocks and rim.

In testimony that I claim the foregoing as my own, I have hereto affixed my signature in the presence of two witnesses.

FRANK DEXTER.

Witnesses:
THOS. J. NEARTY,
CHAS. S. HILL.